United States Patent [19]

Piccoli et al.

[11] Patent Number: 4,553,568
[45] Date of Patent: Nov. 19, 1985

[54] SHAPE RESTORING HOSE

[75] Inventors: Dante E. Piccoli, Canton; Pradeep D. Nadkarni, Akron, both of Ohio

[73] Assignee: The Goodyear Tire & Rubber Company, Akron, Ohio

[21] Appl. No.: 731,759

[22] Filed: May 8, 1985

Related U.S. Application Data

[63] Continuation of Ser. No. 562,665, Dec. 19, 1983, abandoned.

[51] Int. Cl.[4] ............................................. F16L 11/10
[52] U.S. Cl. ..................................................... 138/125
[58] Field of Search ....................... 138/125, 123, 124; 139/387 R

[56] References Cited

U.S. PATENT DOCUMENTS 3,481,368 12/1969 Vansickle et al. ................... 138/125
4,276,908 7/1981 Horne ................................... 138/125

FOREIGN PATENT DOCUMENTS 638400 7/1954 Canada ................................ 138/125

*Primary Examiner*—John W. Shepperd
*Attorney, Agent, or Firm*—R. D. Thompson

[57] ABSTRACT

A flexible hose adapted to regain its original shape after crushing due to a novel braided-spiral reinforcement layer containing one braid member which is a relatively stiff, uncrimped monofilament and a second braid member which is a flexible textile material crimped around the stiff monofilament at each contact point in the braided spiral layer. The braided spiral imparts improved crush and kink resistance to the hose structure. This hose is particularly useful as a gasoline pump dispensing hose which is subject to frequent crushing by vehicle wheels during service.

9 Claims, 5 Drawing Figures

SHAPE RESTORING HOSE

This is a continuation of application Ser. No. 562,665, filed on Dec. 19, 1983, now abandoned.

BACKGROUND OF THE INVENTION

This invention relates to a reinforced hose structure and more particularly to a hose having improved crushed resistance through the use of a braided spiral sleeve in which a first braid member is composed of a relatively stiff uncrimped monofilament which maintains its uncrimped character during the braiding operation and a second braid member which is a relatively flexible textile material which crimps or deforms around the first braid member.

BACKGROUND ART

In applications such as hose used for the dispensing of gasoline, it is desirable for the hose to be flexible yet be capable of regaining its shape after being crushed in service. Hose structures are known in which a liner or tube are covered by two textile braids with a monofilament helically wound between the braids. The process for building hoses of this construction require a mandrel be used to support the tube during braiding and especially during application of the monofilament helix since the monofilament helix exerts a twisting force on the tube. Expensive methods such as lead press curing or fabric wrap curing are required due to the residual twisting force which remains in the uncured hose during the vulcanizing process.

In accordance with the present invention, a lighter weight reinforced hose can be produced which has excellent resistance to kinking. Greater crush resistance is also imparted which means that the hose will regain its shape after it has been crushed. The hose also has an advantage in that it has no residual twisting stress and thus remains stable when placed under internal working pressure exhibiting no twisting in service. These advantages are accomplished by utilizing a flexible hose comprising an elastomeric tube, a braided spiral sleeve surrounding said elastomeric tube having a first braid member and a second braid member under equal tension, said first braid member being composed of at least one strand of relatively stiff, uncrimped monofilament helically wound about said elastomeric tube, said second braid member being composed of a plurality of relatively flexible, crimped textile filaments helically wound oppositely to said first braid member and interwoven with said first braid member such that said second braid member is crimped at each point of contact with said first braid.

The method used for manufacturing the hose of this construction has the advantage of being a non-mandrel hose building process and is adaptable to fully continuous length production. An additional advantage of the method of manufacturing of this hose is that economical curing methods such as open steam, continuous vulcanization utilizing molten salt or hot heat transfer medium, or various fluid bed continuous curing methods. These advantages are accomplished by a non-mandrel method of manufacturing a flexible hose having braided spiral reinforcement comprising (a) extruding an unsupported elastomeric tube, (b) applying a braided spiral sleeve around said elastomeric tube, said braided spiral sleeve being composed of a first braid member wound in a smooth helical path about said tube and a second braid member being braided with said first braid member wherein said second braid member deforms around said first member at each point of contact between first and second braid members, and wherein the tension of first and second braid members are substantially equal.

DETAILED DESCRIPTION OF THE INVENTION

Figure 1:
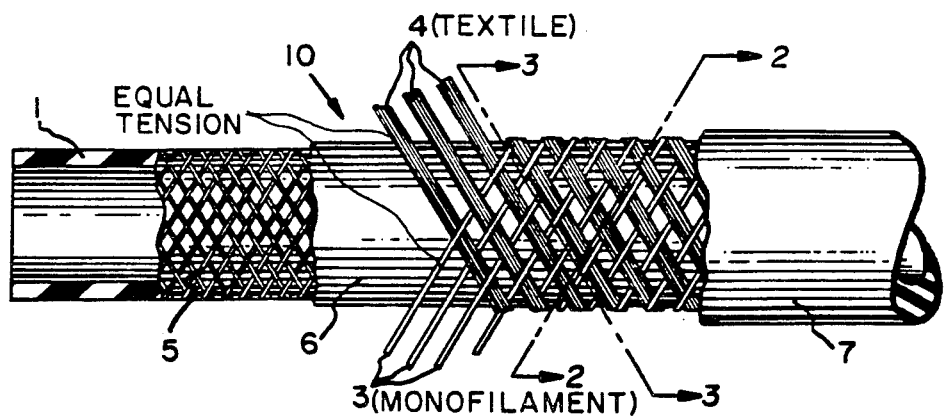
FIG. 1 is a side view of a section of a hose showing the preferred embodiment of this invention with a part in section and other parts broken away for clarity.

Referring to FIG. 1 the hose 10 comprises an elastomeric tube 1 of a material suitable for conveying or containing the fluid to be transported. Any suitable rubber or thermoplastic elastomer known to be useful in hose applications may be used. These may include rubber polymers, such as polychloroprene, acrylonitrile-butadiene, styrene-butadiene, polyisoprene, ethylene-propylene-diene and natural rubber polymers. These polymers may be compounded with other known materials to achieve particular properties required for specific applications. The elastomeric tube 1 is surrounded by a braided spiral sleeve 2 consisting of a first braid member 3 which is composed of one or more relatively stiff monofilaments which are wound in a smooth helical path around the elastomeric tube. A single monofilament 8 is shown for simplicity of illustration although it is to be understood that a plurality of monofilaments may be used to constitute the first braid member 3. The monofilament 8 may be composed of any synthetic polymer suitable for fabrication into a monofilament having sufficient resistance to kinking to be useful. Polyesters, copolyesters, non-aromatic polyamides such as nylon, aromatic polyamides or fiberglass are the preferred materials for the monofilament 8 of this invention. Polyester is most preferred due to the ease of attaining a strong cured bond with the surrounding elastomeric layers of the hose. The monofilament 8 diameter is widely variable depending upon the requirements of the end-use application. Preferably the diameter may range from 0.1 to about 10 millimeters, with most preferred being between 0.3 and 2 millimeters. The second braid member 4 is wound in a helical pattern from an opposite direction. The second braid member 4 is interwoven with the first braid member 3. The second braid member 4 must be very flexible relative to the first braid member 3. Said second braid member may be preferably composed of conventionally used textile filaments 9 and yarns such as nylon, rayon, polyester, or fiberglass etc., materials which are loosely twisted into a suitable textile material for braiding. The first braid member 3 follows a smooth helical course and exhibits no crimping during the braiding operation. The second braid member 4 is interwoven in a helical pattern from an opposite direction and exhibits crimping or kinking at each point where it is interwoven with the first braid member 3. Both braid members must be under substantially equal tension $|T_1|=|T_2|$ during the braiding step. After braiding, the relatively stiff first braid member remains uncrimped and thus lies substantially in an imaginary cylindrical surface surrounding said elastomeric tube at the appropriately spaced radial distance from the outer surface of said elastomeric tube 1. The embodiment shown in FIG. 1 includes a conventional braided textile reinforcement sleeve 5 which may be optionally utilized if the particular hose application requires additional burst strength in the finished hose. A rubber insulation layer 6 may be applied between braided sleeves if more than one such sleeve is utilized.

An elastomeric cover 7 is shown surrounding the outer most braided layer and may be composed of any suitable rubber or thermoplastic elastomer known to be useful in hose constructions.

The equality of tension under which the first braid member and second braid member are applied to the underlying structure is critical to the operation of this invention. The equal tension on each of the component members of the braided spiral is important in two aspects of this invention. The first is that the balanced tension on the braided components allows for a non-mandrel technique to be utilized in hose building since the balanced tension assures that no twisting force is put on the underlying elastomeric tube during its progress through the one or more braiding decks. The second important aspect of this equal braid member tension is in the finished hose where the equal tension assures that a stable non-twisting finished hose is produced upon completion of the curing step. The angle at which the first and second braid members are applied in the braided spiral sleeve is dependent upon the degree of crush resistance required and the amount of internal burst resistance required in the application. It has been found that the braid angles may vary between 45° and 65° when braid angle is measured as the included angle between the braid element and the longitudinal axis of the hose. The preferred range is of braid angle is 50°–60°. Optimal crush resistance is achieved using a braid angle between 53° and 60°.

Figure 2:
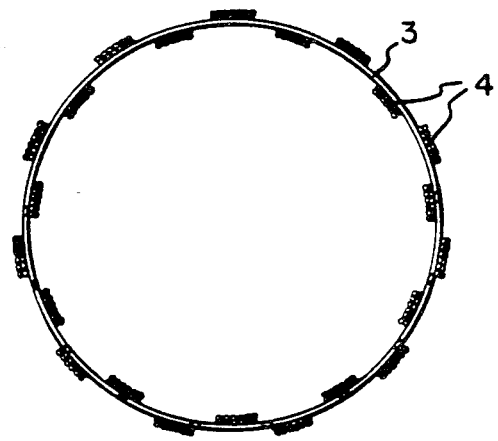
FIG. 2 is a diagonal cross-sectional view of the braided spiral sleeve only as shown in FIG. 1 taken on line 2—2.

FIG. 2 is a cross-sectional view of the braided spiral sleeve taken along line 2—2 which shows more clearly the configuration of the first and second braid members 3 and 4 respectively after the braiding step has been completed. The relatively stiff first braid member 3 is shown in cross section as a smooth uncrimped circle which shows more clearly the smooth helical path of the first braid member. In cross-section the first braid member 3 is shown to clearly lie in a smooth cylindrical surface having a diameter equal to the diameter of the braided spiral sleeve. An alternative description might be that first braid member 3 lies within an annular ring of indeterminate length having a width substantially equal to the diameter of said first braid member 3. Second braid member 4 is shown in cross-section to be deformed around the first braid member 4 at each contact point. Thus unlike the conventional braiding methods in which each braid member is deformed around the other, in the method of this invention the first braid member is uncrimped while only the second braid member is deformed or crimped around the first braid member.

Figure 3:
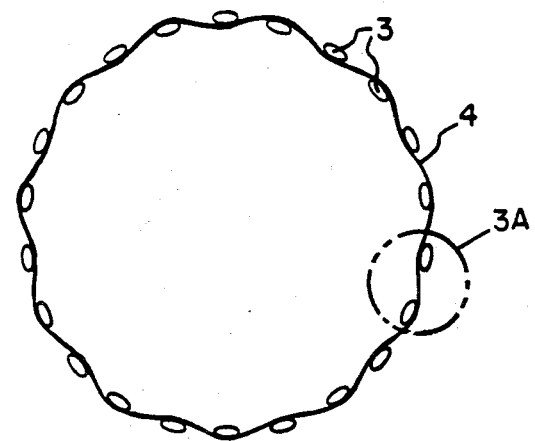
FIG. 3 is a diagonal cross-sectional view of the braided spiral sleeve only as shown in FIG. 1 taken on line 3—3.
Figure 3A:
FIG. 3a is an enlarged view of a portion of FIG. 3.

FIG. 3 is a cross-section of the braided spiral layer in isolation, taken along line 3—3 on FIG. 1. This figure shows the course of the second braid member 4 around the circumference of the braided spiral sleeve 2. It can be clearly seen that the second braid member 4 deforms around the first member during the braiding operation since it is composed of a more flexible material than the first braid member. FIG. 3a shows an enlarged section of FIG. 3 depicting more clearly the plurality of filaments which constitute the second braid member 4.

Figure 4:
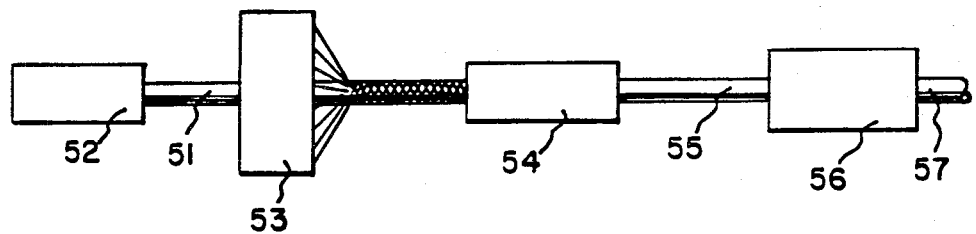
FIG. 4 is a simplified schematic representation of the method of manufacture of the hose of this invention.

FIG. 4 is a simplified schematic representation of the method of manufacturing. Solid and flexible mandrel methods may be employed in the manufacture of this hose. Due to the cost and speed advantages inherent in non-mandrel techniques the preferred manufacturing method of this invention is an non-mandrel method for producing a braided spiral hose. An unsupported elastomeric tube member 51 is produced using conventional tube making equipment such as an extruder 52. Tube member 51 may optionally have positive pressure applied inside to assist in maintaining its circular cross-section. FIG. 4 shows the elastomeric tube 51 being fed directly to a braider 53 for application of the braided spiral sleeve. It should be noted that the process for manufacturing the elastomeric tube may be such that it is desirable for the elastomeric tube to be produced in a separate step and later fed into the braider 53. Conventional braider equipment may be utilized provided that equal tensioning of the individual braid members can be maintained. The braider may apply one or more braided sleeves to the elastomeric tube in a single pass. The carriers of the braider which wind a braid member in a first direction must carry the first braid member, a relatively stiff monofilament. The carriers which apply the second braid member from the opposite direction should carry the second braid member material. The second braid member is substantially more flexible than the first braid member and will deform around the stiff first braid member during the braiding operation.

If a conventional braid reinforcement sleeve is being applied in addition to one or more braided spiral sleeves, both sets of carriers of the braider are loaded with conventional textile reinforcement materials. Once the desired number of braided spiral sleeves and conventional braided sleeves have been applied an elastomeric cover material may optionally be applied over the braided sleeves by cover applicator 54. Any conventional process for application of cover layers to a hose may be utilized with the most common method being the use of a cross-head extruder. The uncured composite hose 55 exits from the cover applicator 54 and proceeds to the curing process 56. The curing process may be any conventionally known method of curing or vulcanizing hose. The preferred methods are those in which the uncured composite hose is subjected to the high temperature curing environment immediately with no intervening steps. These methods include open steam curing, fluidized bed curing, continuous vulcanization using heat transfer media such as molten salts or hot oil. These direct curing methods are preferred due to the simplicity, efficiency and resulting low cost. Other more expensive curing methods employing additional preparation steps may be utilized to produce the hose of this invention. These include lead press curing in which a coating of molten lead is applied to the uncured hose composite; solidified; and then put in open steam curing or autoclave equipment for vulcanization. Another curing method in which an additional step is required is the fabric-wrap method in which fabric is spiraled over the uncured hose composite for the purpose of applying external pressure to the composite prior to the introduction of the uncured hose composite to the high temperature curing conditions. The most preferred method of manufacturing this hose is by low cost, non-mandrel manufacturing techniques which are not generally compatible with the more expensive curing methods such as lead press or fabric wrap techniques.

Figure 5:
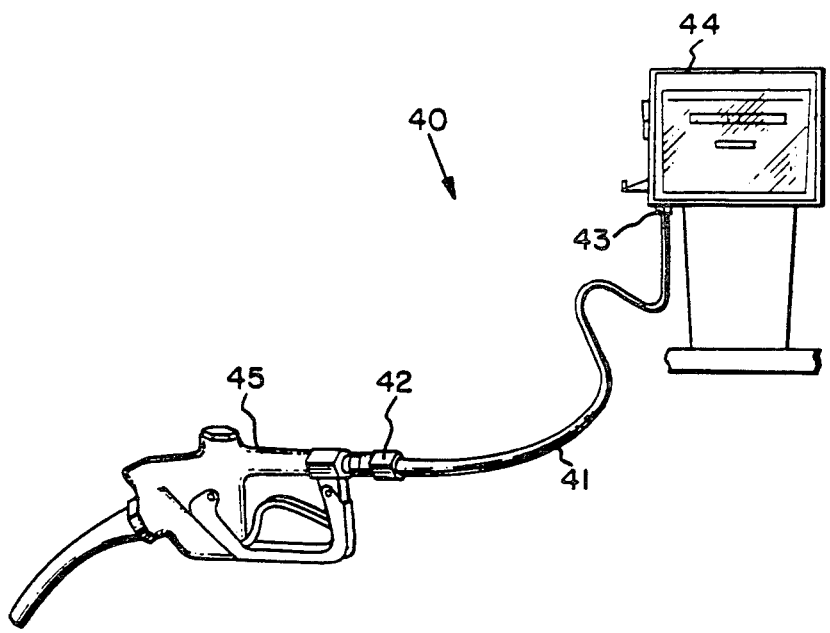
FIG. 5 is a pictorial representation of the hose of this invention used in a fluid transfer system.

FIG. 5 illustrates an exemplary embodiment of a fluid transfer system 40 which is adapted for transport of flammable liquids such as gasoline or fuel oil. The braided spiral hose 41 of this invention is used in combination with a first coupling 42 which is securely fastened to a first end of the hose 41 to form a fluid-tight seal. The braided spiral hose 41 is similar in all respects to the hose 10 of FIG. 1. A second coupling 43 is securely fastened to a second end of the hose 41 to form a fluid-tight seal. Couplings 42 and 43 are well known and conventional in all respects and may be selected for the particular application by one skilled in this art. First coupling 42 is attached to a dispensing nozzle 45. The attachment may be rotatable or fixed. Second coupling 43 is attached to a pumping apparatus 44, shown as a conventional gasoline pump. The pumping apparatus delivers fluid to the fluid transfer system from a fluid storage means, not shown. The dispensing nozzle 45 transfers fluid to a receiving tank 45 such as an automobile tank.

A preferred embodiment of this invention was manufactured for use in a fluid transfer system as illustrated in FIG. 5 using an elastomeric tube composed of rubber (NBR) blended with polyvinyl chloride (PVC) for use with gasoline or diesel fuels. The unsupported tube was extruded continuously with no supporting mandrel and fed to a multideck braider. A conventional rayon textile braid was applied in a sleeve directly over the elastomeric tube. An insulating layer of NBR rubber was then applied after the first rayon textile braid. The braided spiral sleeve was applied over the insulating layer of rubber. The braided spiral layer was composed of a first braid member of 0.7 millimeter polyester monofilament and a second braid member of rayon textile yarn braided in the opposite direction. The braid angle utilized was 60° in order to optimize kink resistance and crush resistance and limit expansion of the hose under internal pressure. The first and second braid members wire applied under equal tension of 2.5 pounds. An NBR/PVC cover was then applied by cross-head extrusion over the braided spiral layer. A wire ribbon extending the full length of the hose was laid longitudinally under the first textile braid for the purpose of conducting static electricity. This conductive or bonding wire is required in the gasoline dispensing hose specifications to dissipate static charges and conduct any charges to ground. The uncured hose composite was then cured in open steam.

While a limited number of exemplary embodiments of the invention have been shown and described in detail, it will be apparent to those skilled in the art that various changes and modifications may be made therein without departing from the scope of the invention as covered.

We claim:

1. A flexible, kink resistant hose capable of regaining an original shape after crushing comprising: an elastomeric tube; a shape restoring layer of a single braided spiral sleeve surrounding said elastomeric tube having a first braid member and a second braid member under equal tension at braid angles between 50° and 60°, said first braid member being composed of at least one strand of relatively stiff, uncrimped monofilament helically wound about said elastomeric tube only in one direction to form a uniform diameter non-overlapping spiral, wherein said uncrimped monofilament is selected from the group consisting of polyesters, copolyesters, aromatic polyamides, non-aromatic polyamides and fiberglass, said second braid member being composed of a plurality of relatively flexible, crimped textile filaments helically wound only in an opposite direction to said first braid member and interwoven with said first braid member such that said second braid member is crimped at each point of contact with said first braid said monofilament contacting only said second braid member, whereby said braided spiral layer acts to restore the hose to the original shape after crushing.

2. A flexible hose of claim 1 wherein said uncrimped monofilament has a diameter of from about 0.1 to about 10 mm.

3. A flexible hose of claim 1 further comprising a second braided sleeve disposed between said braided spiral sleeve and said elastomeric tube, said second braided sleeve being composed of crimped, textile yarns.

4. A flexible hose of claim 1 wherein said uncrimped monofilament is selected from the group consisting of polyesters, copolyesters, aromatic polyamides, non-aromatic polyamides and fiberglass.

5. A hose of claim 1 further comprising an elastomeric cover applied around said braided spiral sleeve.

6. A flexible, kink resistant hose capable of regaining its original shape after crushing, comprising: an elastomeric tube surrounded by a shape restoring layer of a single braided reinforcement layer consisting of a first braid member and a second braid member, said first braid member being composed only of at least one relatively stiff monofilament wound in a smooth helical pattern around said elastomeric tube, wherein said uncrimped monofilament is selected from the group consisting of polyesters, copolyesters, aromatic polyamides, non-aromatic polyamides and fiberglass, and wherein said first braid member lies substantially in an imaginary cylindrical surface radially spaced from said elastomeric tube a distance substantially equal to the diameter of said first braid member, said second braid member being composed of relatively flexible textile material which is helically wound oppositely of said first braid member and interwoven such that said second braid member is deformed around said first braid member at each point of contact between said braid members, said first and second braid members being equally stressed in said braided reinforcement layer and braided at braid angles of between 50° and 60° relative to a longitudinal axis of the hose whereby said braided spiral layer acts to restore the hose to the original shape after crushing.

7. A flexible hose according to claim 6 further comprising a braided textile sleeve positioned radially inward or outward of said braided spiral sleeve and a radially outermost elastomeric cover.

8. A flexible, kink resistant hose capable of regaining its original shape after crushing comprising:
(a) an elastomeric tube;
(b) a single braided shape restoring layer of braided spiral sleeve disposed about said elastomeric tube, said braided spiral sleeve being composed of a first member helically applied and a second braid member helically applied oppositely to the first member and braided with said first member at substantially equal tensions at a braid angle greater than 54 degrees, said first braid member being free from crimp and solely composed of relatively stiff monofilaments selected from the group consisting of polyesters, copolyesters, aromatic polyamides, non-aromatic polyamides and fiberglass, said second braid member being relatively flexible and crimped around said first braid member at each point of contact between said members and composed solely of a multiplicity of individual textile filaments, whereby said braided spiral sleeve acts to restore the hose to the original shape after crushing.

9. A flexible hose of claim 8 further comprising at least one additional braided textile sleeve disposed between said elastomeric tube and said braided spiral sleeve.

* * * * *